Sept. 10, 1935. A. J. BAILIE 2,014,123
RAKE
Filed April 13, 1934
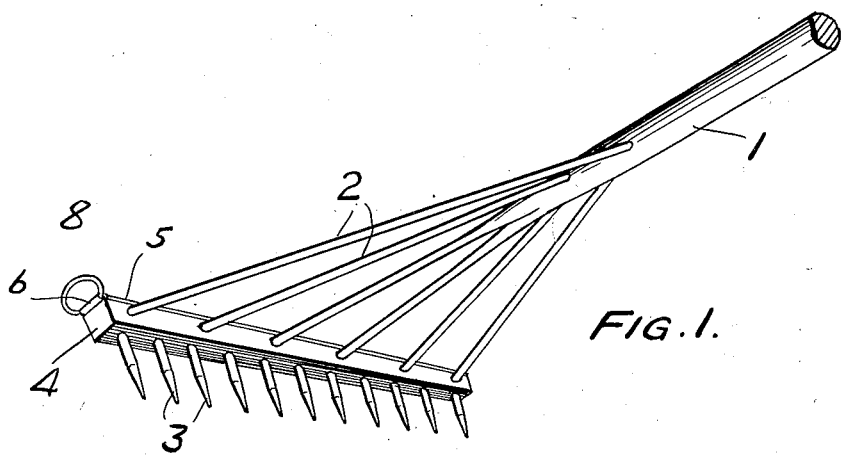
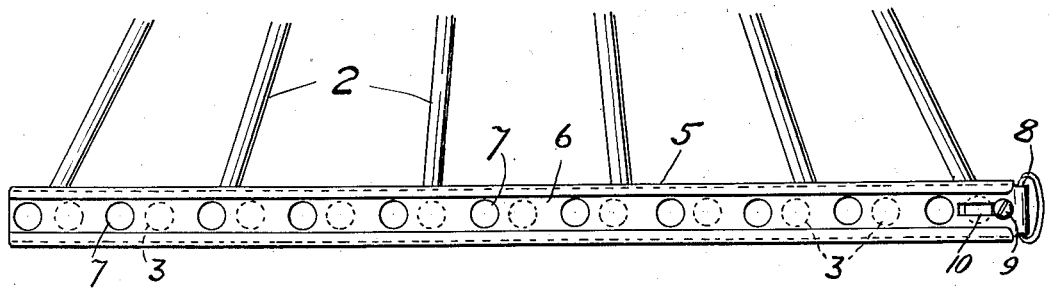
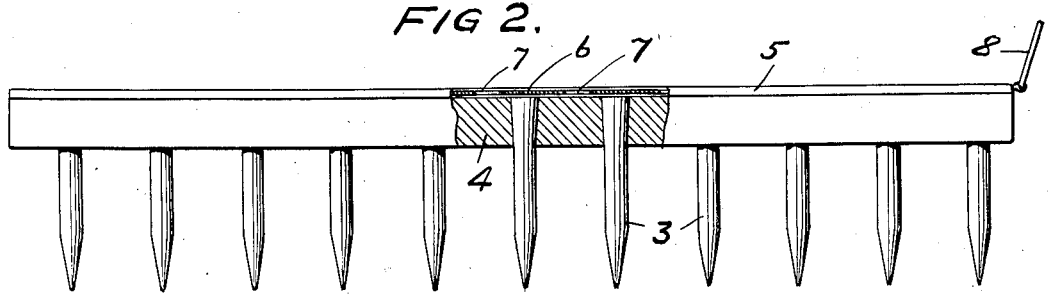
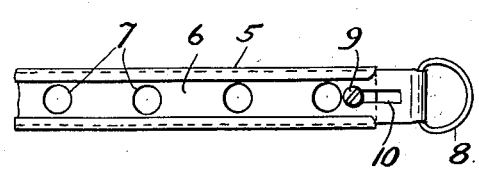
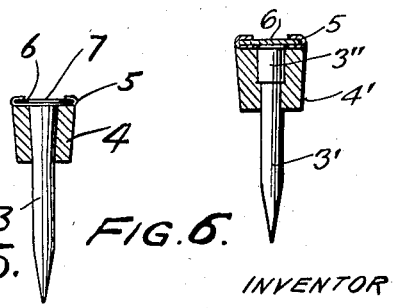
WITNESS:
INVENTOR
Alfred J. Bailie Patented Sept. 10, 1935

2,014,123

UNITED STATES PATENT OFFICE 2,014,123

RAKE

Alfred J. Bailie, Wyndmoor, Chestnut Hill, Pa.

Application April 13, 1934, Serial No. 720,423

5 Claims. (Cl. 55—114)

This invention relates to an improved form of lawn or garden rake.

The improved rake in accordance with this invention is so constructed that the teeth thereof may be easily and readily removed if broken and may be replaced by other teeth. The ordinary form of rake does not have teeth which can be removed or can be replaced with others, and accordingly if very many of the teeth are broken the whole rake becomes practically useless and must be discarded. There are certain known types of rakes in which, it is true, the teeth are removable. However, this process requires a complete disassembling of the rake; while, in accordance with this invention, there is provided a rake in which the teeth are removable very simply and rapidly.

The structure of the improved rake in accordance with this invention may best be shown by a description of the accompanying drawing, in which—

Fig. 1 is a perspective view of the rake proper, showing a portion of the handle;

Fig. 2 is a plan view of the cross bar and supporting ribs of the rake;

Fig. 3 is a front elevation, partly in section, of the head of the rake;

Fig. 4 is a detail view of a portion of the head of the rake with the teeth removed showing the construction of the locking member;

Fig. 5 is a cross section through the cross bar of the rake.

Fig. 6 is a cross section through the cross-bar of a modified rake structure showing a different form of removable teeth.

The rake consists of the usual wooden handle 1, which is forked at its lower end and provided with ribs 2 which serve to carry the cross bar 4. The cross bar 4, which may be of wood or metal, is provided with a plurality of holes which may be tapered, as shown in Fig. 5, or which may be provided with a shoulder as shown in Fig. 6, so that the teeth 3 of the rake can only be inserted and removed from the top of the cross bar. Attached to the top of the cross bar there is a channel member 5 provided with holes aligned with the holes in the cross bar 4. Carried within this channel member 5 and held in place by the groove edges thereof is a slide 6 which is provided with a plurality of holes 7 so arranged that when the ends of the slide and channel members respectively are in the same plane the holes are not in alignment with the holes of the cross bar 4. The slide is provided with a ring 8 at one end, and the motion of the slide is limited in each direction by means of a screw or peg 9 set in the cross bar through groove 10 of the slide. When the slide is pulled out by means of the ring 8 to the limit of motion thereof, as shown in Fig. 4, the holes 7 in the slide will be aligned with the holes in the cross bar.

With the slide in this position, that is to say, with the holes 7 aligned with the holes in the cross bar, the teeth 3 of the rake may easily be inserted or removed from the cross bar through the holes 7. The teeth 3 will be provided with a tapered head portion conforming with the contour of the holes in the cross bar 4 and can accordingly only be inserted or removed through the holes 7 of the slide member. In the modification shown in Fig. 6, the teeth 3' will be provided with an enlarged head portion 3" which engages the conforming shoulder of the holes in the crossbar 4'. When the slide member is moved back to the position shown in Fig. 2, the teeth are firmly held in place and cannot be removed until the slide is again operated to bring the holes 7 into alignment with the teeth.

It will thus be seen that if any tooth on the rake should be broken during the use thereof it may be rapidly removed by operating the slide member 6 so as to bring the holes 7 into alignment with the teeth, pushing the broken tooth upwardly out of the cross bar and inserting in place of the broken tooth a new one. The new tooth having been inserted in place, the slide member 6 will be pushed back again, securely locking all the teeth in position.

What I claim and desire to protect by Letters Patent is:

1. A rake comprising a handle, a cross-bar attached thereto and provided with a plurality of openings extending through the cross-bar, a plurality of teeth adapted to be inserted in said openings, the contour of the said teeth and of the walls of the said openings being such that the teeth are removable therefrom only by motion in a direction opposite to that of their extension through the cross-bar, and a locking member attached to said cross-bar and movable longitudinally along the cross-bar, said locking member being adapted when in one position to prevent removal of said teeth from said cross-bar and when in a second position to permit removal of any tooth from said cross-bar.

2. A rake comprising a handle, a cross-bar attached thereto and provided with a plurality of openings extending through the cross-bar, a plurality of teeth adapted to be inserted in said openings, the contour of the said teeth and of the walls of the said openings being such that the teeth are removable therefrom only by motion in a direction opposite to that of their extension through the cross-bar, guides mounted longitudinally along said cross-bar, and a slide member movable in said guides and provided with a plurality of holes normally positioned out of alignment with said teeth so as to prevent their removal from said cross-bar but adapted upon movement of said slide member to another position to become aligned with said teeth so as to permit their removal from said cross-bar.

3. A rake comprising a handle, a cross-bar attached thereto and provided with a plurality of tapered openings extending through the cross-bar, a plurality of tapered teeth adapted to be inserted in said openings, the direction of the taper being such that the teeth are removable therefrom only by motion in a direction opposite to that of their extension through the cross-bar, and a locking member attached to said cross-bar and movable longitudinally along the cross-bar, said locking member being adapted when in one position to prevent removal of said teeth from said cross-bar and when in a second position to permit removal of any tooth from said cross-bar.

4. A rake comprising a handle, a cross-bar attached thereto and provided with a plurality of tapered openings extending through the cross-bar, a plurality of tapered teeth adapted to be inserted in said openings, the direction of the taper being such that the teeth are removable therefrom only by motion in a direction opposite to that of their extension through the cross-bar, guides mounted longitudinally along said cross-bar, and a slide member movable in said guides and provided with a plurality of holes normally positioned out of alignment with said teeth so as to prevent their removal from said cross-bar but adapted upon movement of said slide member to another position to become aligned with said teeth so as to permit their removal from said cross-bar.

5. A rake comprising a handle, a cross-bar attached thereto and provided with a plurality of openings extending through the cross-bar, a plurality of teeth adapted to be inserted in said openings, the contour of the said teeth and of the walls of the said openings being such that the teeth are removable therefrom only by motion in a direction opposite to that of their extension through the cross-bar, guides mounted on said cross-bar, and a slide member movable in said guides and provided with a plurality of holes normally positioned out of alignment with said teeth so as to prevent their removal from said cross-bar but adapted upon movement of said slide member to another position to become aligned with said teeth so as to permit their removal from said cross-bar.

ALFRED J. BAILIE.